US012679232B2

(12) United States Patent
Shin et al.

(10) Patent No.: US 12,679,232 B2
(45) Date of Patent: Jul. 14, 2026

(54) CHARGER LATCH ASSISTING DEVICE

(71) Applicants: Hyundai Motor Company, Seoul (KR); Kia Corporation, Seoul (KR)

(72) Inventors: Yong Chul Shin, Hwaseong-si (KR); Hwa Woong Yoo, Suwon-si (KR); Byung Ho Yoon, Seoul (KR); Ki Hoon Nam, Gwangmyeong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 298 days.

(21) Appl. No.: 18/496,371

(22) Filed: Oct. 27, 2023

(65) Prior Publication Data

US 2024/0270096 A1     Aug. 15, 2024

(30) Foreign Application Priority Data

Feb. 10, 2023     (KR) ........................ 10-2023-0018311

(51) Int. Cl.
*B60L 53/16* (2019.01)
*H01R 13/627* (2006.01)
*H01R 13/639* (2006.01)
*H01R 13/641* (2006.01)

(52) U.S. Cl.
CPC .......... *B60L 53/16* (2019.02); *H01R 13/6275* (2013.01); *H01R 13/6397* (2013.01); *H01R 13/641* (2013.01)

(58) Field of Classification Search
CPC . B60L 53/16; H01R 13/6275; H01R 13/6397; H01R 13/641
See application file for complete search history.

(56) References Cited

U.S. PATENT DOCUMENTS

| | | | |
|---|---|---|---|
| 7,896,360 B2 | 3/2011 | Buma | |
| 8,172,026 B2 | 5/2012 | Yamazaki | |
| 9,509,095 B2 | 11/2016 | Ohmura et al. | |
| 9,909,633 B2 | 3/2018 | Tanahashi et al. | |
| 11,139,616 B2 | 10/2021 | Takagi | |
| 2010/0147101 A1 | 6/2010 | Yamazaki | |
| 2010/0164189 A1 | 7/2010 | Buma | |
| 2013/0241484 A1* | 9/2013 | Kiko | B60L 53/65 320/109 |
| 2015/0155656 A1 | 6/2015 | Sugiyama et al. | |
| 2016/0230824 A1 | 8/2016 | Tanahashi et al. | |
| 2020/0148068 A1* | 5/2020 | Melatti | B60L 53/60 |
| 2020/0406470 A1* | 12/2020 | Herold | B25J 11/008 |
| 2021/0257781 A1 | 8/2021 | Takagi | |

(Continued)

FOREIGN PATENT DOCUMENTS

| | | |
|---|---|---|
| JP | 2011165609 A | 8/2011 |
| JP | 2018207682 A | 12/2018 |
| JP | 2021052459 A | 4/2021 |

(Continued)

*Primary Examiner* — Sean Gugger

(74) *Attorney, Agent, or Firm* — Slater Matsil, LLP

(57) ABSTRACT

An embodiment charger latch assisting device includes a contactor provided in contact with a latch button of a charger, an output clutch coupled to the contactor to rotate in conjunction with the contactor, a detection target coupled to the output clutch to move in conjunction with the output clutch, and a detector configured to detect a movement of the detection target to identify a movement of the latch button.

20 Claims, 20 Drawing Sheets

(56)          References Cited

U.S. PATENT DOCUMENTS

| | | |
|---|---|---|
| 2022/0166161 A1 | 5/2022 | Hsu et al. |
| 2024/0270096 A1 | 8/2024 | Shin et al. |

FOREIGN PATENT DOCUMENTS

| | | |
|---|---|---|
| JP | 2021128932 A | 9/2021 |
| JP | 2022030182 A | 2/2022 |
| KR | 20080083708 A | 9/2008 |
| KR | 20090092323 A | 8/2009 |
| KR | 101413431 B1 | 7/2014 |
| KR | 20160098078 A | 8/2016 |
| KR | 101928068 B1 | 12/2018 |
| KR | 102093597 B1 | 3/2020 |
| KR | 20240125373 A | 8/2024 |

* cited by examiner

1

113

111

16

112

1

142f

1401f

141f

14f

152f

151f

15f

142g

141g

14g

152g

151g

15g

CHARGER LATCH ASSISTING DEVICE

CROSS-REFERENCE TO RELATED APPLICATIONS

This application claims the benefit of Korean Patent Application No. 10-2023-0018311, filed on Feb. 10, 2023, which application is hereby incorporated herein by reference.

TECHNICAL FIELD

The present disclosure relates to a charger latch assisting device.

BACKGROUND

A charging automation device may be provided to charge an electric vehicle. The charging automation device may automatically perform a charging operation without operator intervention by coupling a charger to a charging port to perform a charging operation when the electric vehicle moves to a predetermined position and by separating the charger from the charging port when the charging operation is completed.

A latch device may be provided in the charger to identify whether the charger is correctly coupled to the charging port. When the charger is correctly coupled to the charging port, the latch device may perform a locking operation to prevent separation between the charging port and the charger, and when the charging operation is completed, the latch device is unlocked, and thus the charger may be separated from the charging port.

The charging automation device may include a general charger and a device that assists the general charger so that the charging operation may be automatically performed and also may be manually performed by an operator. Various devices may be provided to assist the charger, and one of the types of various devices may be a device that assists the operation of the charger in relation to the above-described latch device and identifies a state of the latch device.

SUMMARY

Embodiments of the present disclosure can solve problems occurring in the prior art while advantages achieved by the prior art are maintained intact.

An embodiment of the present disclosure provides an assisting device that assists an operation of a latch device of a charger for automation of a charging operation.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, there is provided a charger latch assisting device including a contactor provided in contact with a latch button of a charger, an output clutch coupled to the contactor to rotate in conjunction with the contactor, a detection target coupled to the output clutch to move in conjunction with the output clutch, and a detector that detects the movement of the detection target to identify movement of the latch button.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
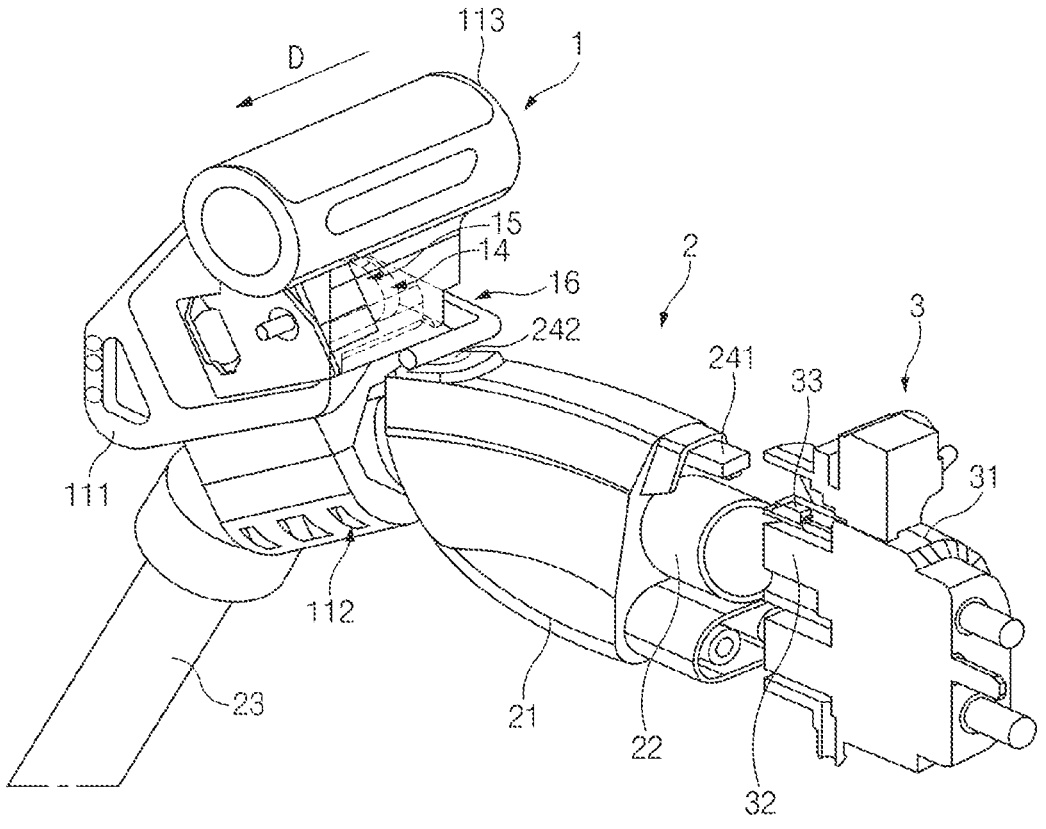
FIG. 1 is a perspective view illustrating a charger and a charger latch assisting device according to a first embodiment of the present disclosure.

Hereinafter, some exemplary embodiments of the present disclosure will be described in detail with reference to the drawings. In adding reference numerals to components of each drawing, it should be noted that identical or equivalent components are designated by an identical numeral even when they are displayed on other drawings. Further, in describing the embodiments of the present disclosure, a detailed description of the related known configuration or function will be omitted when it is determined that it interferes with the understanding of the embodiments of the present disclosure.

Further, in the description of components of the embodiments of the present disclosure, the terms such as first, second, A, B, (a), and (b) may be used. These terms are merely intended to distinguish one component from other components, and the terms do not limit the nature, order, or sequence of the components. It should be understood that when one component is "connected," "coupled," or "joined" to another component, the former may be directly connected or joined to the latter or may be "connected," "coupled," or "joined" to the latter with a third component interposed therebetween.

Figure 2:
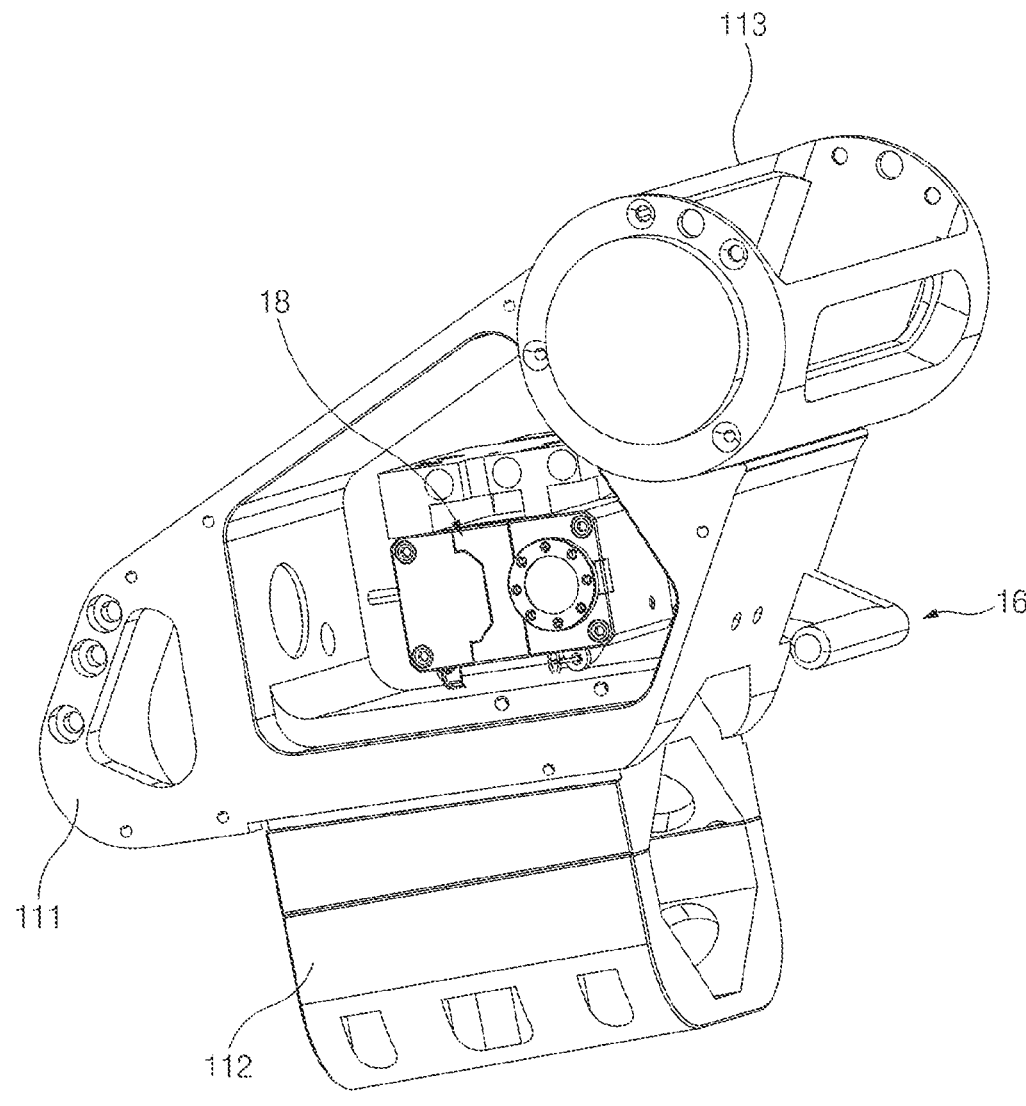
FIG. 2 is a perspective view of the charger latch assisting device according to the first embodiment of the present disclosure.
Figure 3:
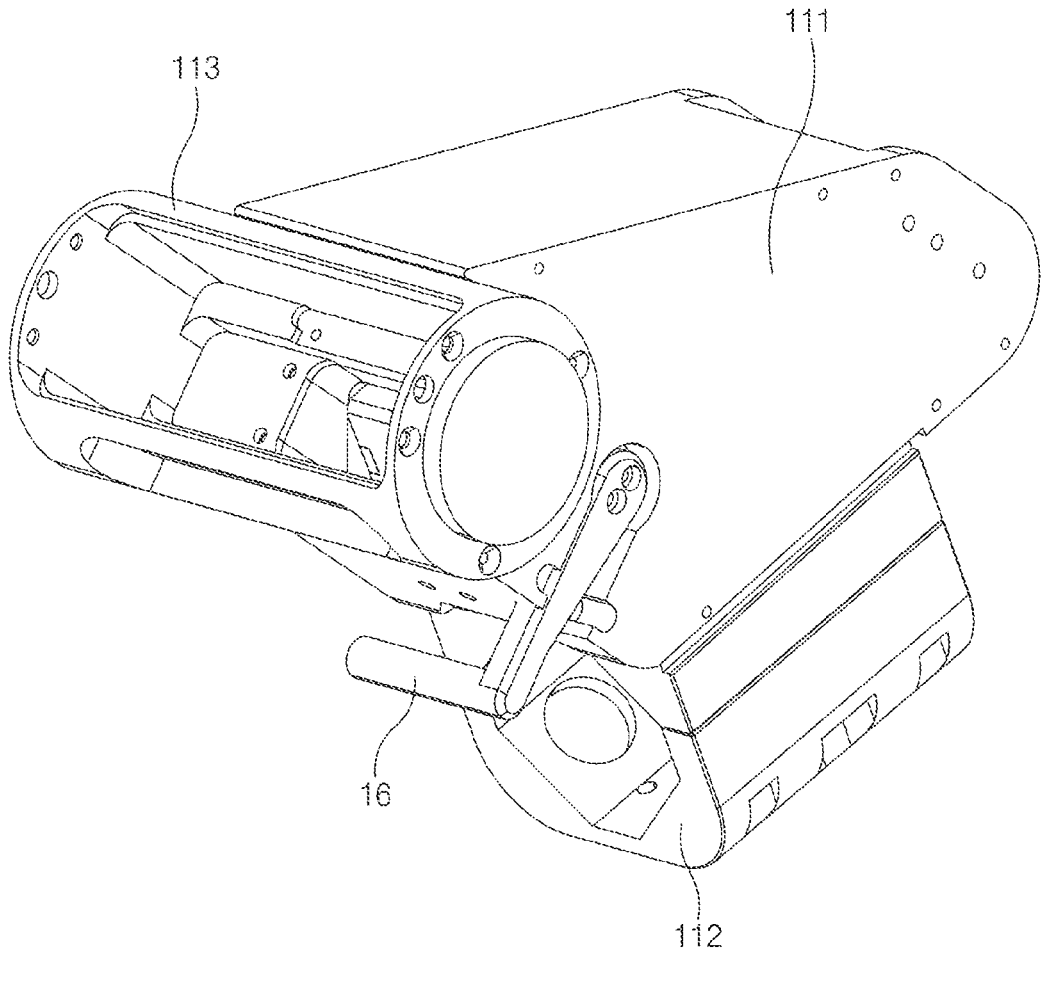
FIG. 3 is a perspective view of the charger latch assisting device of FIG. 2 when viewed from another angle.
Figure 4:
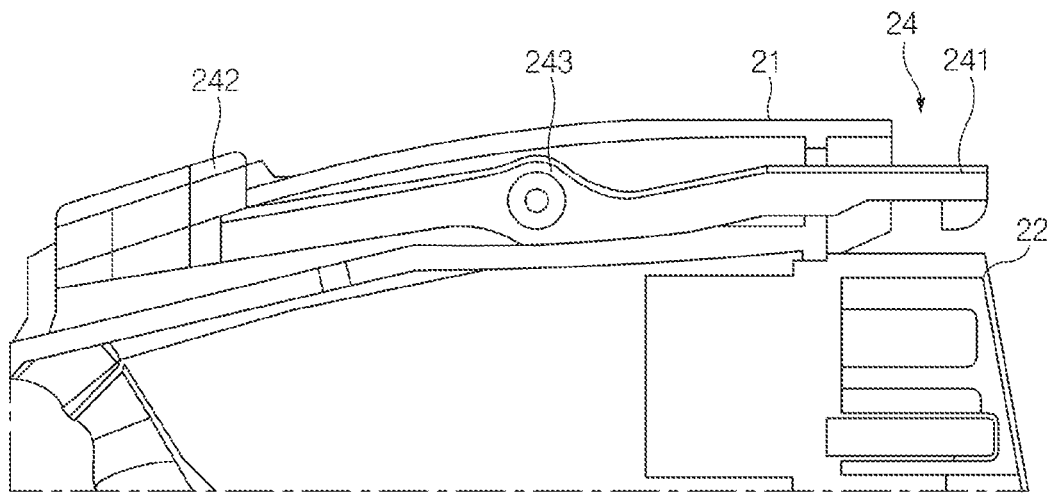
FIG. 4 is a longitudinal cross-sectional view of an upper portion of the charger.

FIG. 1 is a perspective view illustrating a charger 2 and a charger latch assisting device 1 according to a first embodiment of the present disclosure. FIG. 2 is a perspective view of the charger latch assisting device 1 according to the first embodiment of the present disclosure. FIG. 3 is a perspective view of the charger latch assisting device 1 of FIG. 2 when viewed from another angle. FIG. 4 is a longitudinal cross-sectional view of an upper portion of the charger 2.

Referring to the drawings, a charger assembly according to an embodiment of the present disclosure includes the charger 2 and the charger latch assisting device 1. The charger 2 and the charger latch assisting device 1 may be coupled to each other to constitute the charger assembly.

The charger 2 may be connected to a charging port 3. The charging port 3 may be formed in a vehicle. The charger 2 is physically and electrically connected to the charging port 3 at the same time. Further, when the charger 2 is connected to the charging port 3, the vehicle may be charged.

The charging port 3 may include a port body 31, a port adapter 32 protruding from the port body 31 and coupled to the charger 2, and a port stopper 33 which is positioned adjacent to the port adapter 32 and by which a latch 24 of the charger 2 is stopped. The latch 24 is stopped by the port stopper 33 so that the charger 2 may not be separated from the charging port 3 until a separate operation is performed. The port stopper 33 has an oblique surface on a side facing the charger 2 and a vertical surface on an opposite side thereto, and thus may guide insertion when the latch 24 is inserted and prevent separation of the latch 24 when the latch 24 is not to be separated.

The charger 2 may include a charging adapter 22, a charging housing 21, the latch 24, and a charging cable 23. The charging cable 23 may include a conductive wire to electrically connect a power source and the charging adapter 22. To protect the conductive wire, the charging cable 23 may include an outer skin made of an insulating material. The charging adapter 22 is a part that is physically and electrically connected to the port adapter 32 and transmits a current transmitted by the conductive wire included in the charging cable 23 to the port adapter 32 to perform a charging operation.

A portion of the charging adapter 22 and a portion of the latch 24 may be accommodated inside the charging housing 21. The latch 24 may be rotatably coupled to an inside of the charging housing 21. The latch 24 may include a return member having elasticity and thus may have a property of returning to an original position thereof even when being rotated by an external force.

The latch 24 is a component that is stopped by the port stopper 33 to prevent the charger 2 from being separated from the charging port 3. The latch 24 may include a latch body 243 and a latch protrusion 241 that may protrude from one end of the latch body 243 and may be stopped by the port stopper 33. The latch 24 may include a latch button 242 formed at the other end of the latch body 243 and exposed to the outside, and thus an external force may be applied to the latch button 242. The latch body 243 may be rotatably coupled to the charging housing 21 with a reference direction "D" as an axial direction. A default position of the latch 24 to which the latch body 243 returns by the return member included in the latch 24 may be a position at which the latch protrusion 241 is stopped by the port stopper 33. When the latch button 242 is pressed downward, the latch protrusion 241 may raise to release a locked state, and when the latch protrusion 241 raises, the latch button 242 may lower. Thus, the latch button 242 is pressed to separate the charger 2 from the charging port 3, and thus the latch protrusion 241 may be separated from the port stopper 33.

The charger latch assisting device 1 may include an assisting coupler 112 and an assisting housing 11. The assisting coupler 112 and the assisting housing 11 may be coupled to each other. The assisting coupler 112 may be coupled to the charging housing 21 or the charging cable 23 of the charger 2 to fix the assisting housing 111 to the charger 2. The assisting coupler 112 may be coupled to the charging housing 21 while surrounding the charging housing 21 or the charging cable 23. The assisting housing 111 may accommodate components such as an output clutch 14 of the charger latch assisting device 1 therein. A sensor accommodator 113 for accommodating various sensors and the like may be formed at an upper end of the assisting housing 11. Various sensors and the like are accommodated in the sensor accommodator 113, and thus various pieces of information for performing a charging operation using the charger 2 may be collected.

Figure 5:
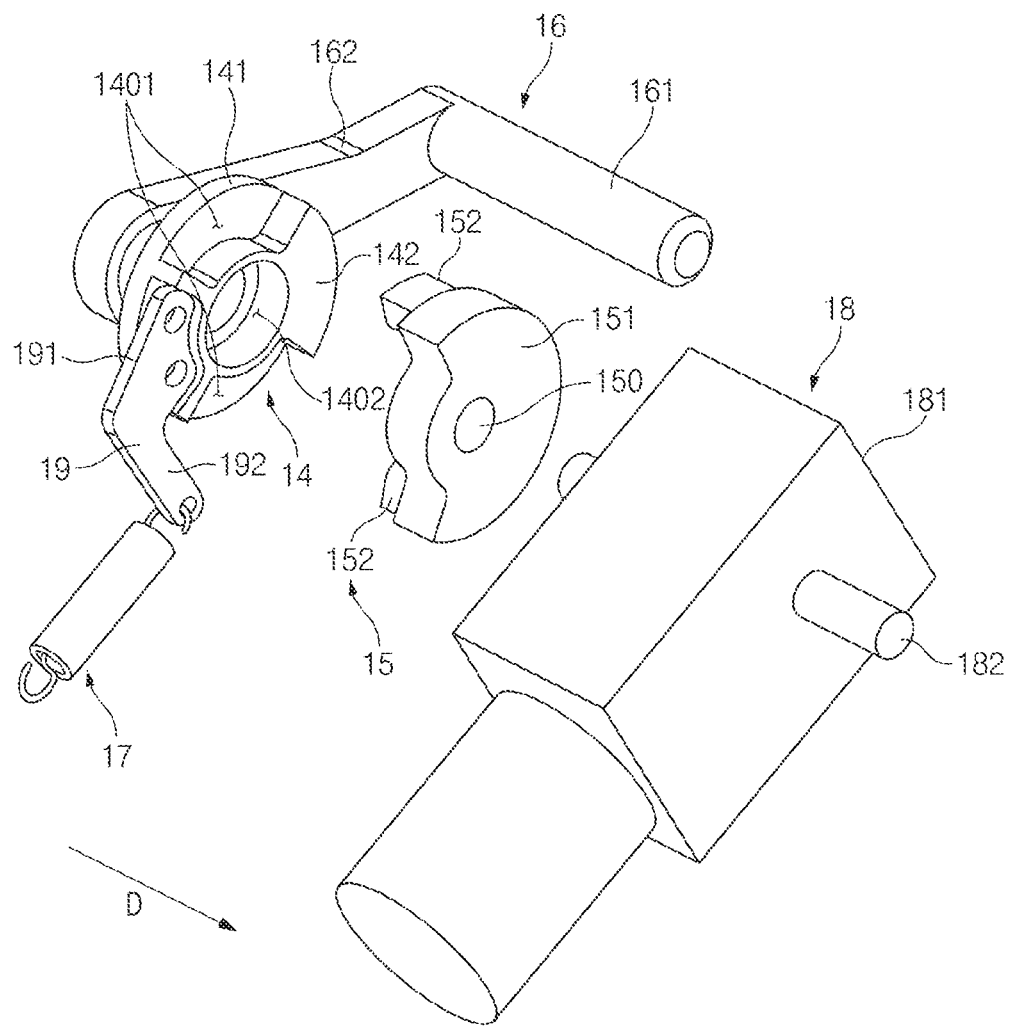
FIG. 5 is an exploded perspective view illustrating some components of the charger latch assisting device according to the first embodiment of the present disclosure.
Figure 6:
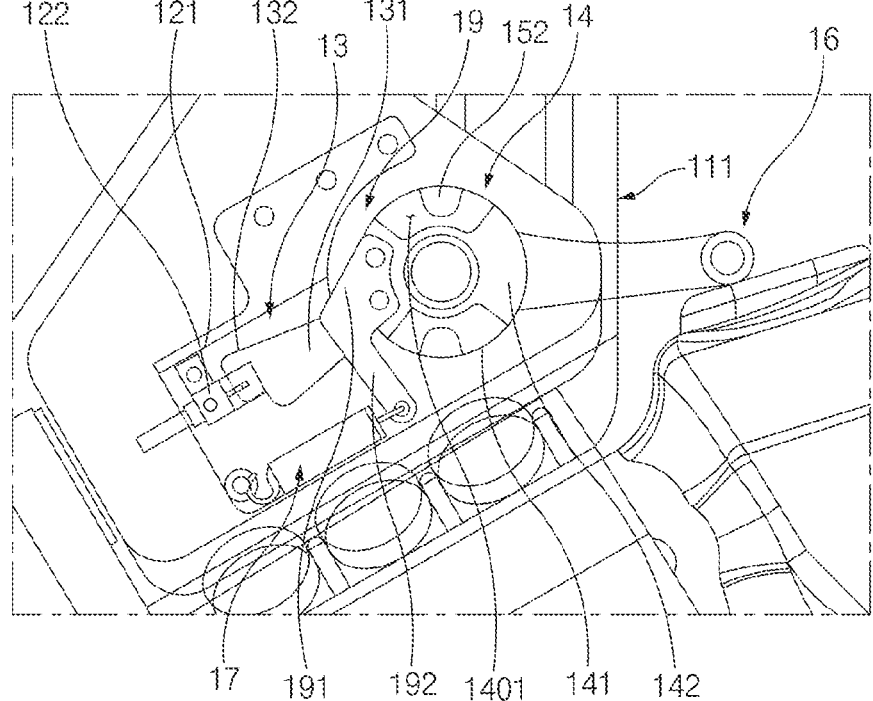
FIG. 6 is a longitudinal cross-sectional view of the charger latch assisting device according to the first embodiment of the present disclosure.

FIG. 5 is an exploded perspective view illustrating some components of the charger latch assisting device 1 according to the first embodiment of the present disclosure. FIG. 6 is a longitudinal cross-sectional view of the charger latch assisting device 1 according to the first embodiment of the present disclosure.

The charger latch assisting device 1 includes a contactor 16 and the output clutch 14. The charger latch assisting device 1 may include an input clutch 15. The charger latch assisting device 1 may include a detection target 13 and a detector 122.

When the charger latch assisting device 1 is coupled to the charger 2, the contactor 16 is provided to be in contact with the latch button 242 of the charger 2. One portion of the contactor 16 may be positioned inside the assisting housing 11, and the other portion thereof may be exposed to the outside to be in contact with the latch button 242. The contactor 16 may include a connection link 162 extending from the output clutch 14 and a contact link 161 extending from the connection link 162 to be in contact with the latch button 242. The connection link 162 may protrude in a direction crossing the reference direction "D," and the contact link 161 may extend from an end of the connection link 162 in the reference direction "D."

The contact link 161 is formed in a cylindrical shape, and thus may be smoothly in contact with the latch button 242, but the shape of the contact link 161 is not limited thereto. Due to an action of an elastic member 17, which will be described below, the contact link 161 may be maintained in contact with the latch button 242. The contact link 161 may be rotatably coupled to the end of the connection link 162 with the reference direction "D" as an axial direction.

The output clutch 14 is coupled to the contactor 16 to move in conjunction with the contactor 16. The output clutch 14 may be rotatably coupled to the assisting housing 11. The output clutch 14 may be rotatably coupled to the assisting housing 11 with the reference direction "D" as an axial direction. Thus, when the contact link 161 of the contactor 16 receives an external force upward by the latch button 242, the output clutch 14 may rotate thereby, and when the output clutch 14 rotates by receiving an external force by the input clutch 15 or the elastic member 17, which will be described below, the contactor 16 may also lower accordingly and press the latch button 242 downward.

The output clutch 14 may include an output body 141 and an output protrusion 142. The output body 141 may be coupled to the contactor 16, and the output protrusion 142 may protrude from the output body 141 in the reference direction "D" to form an output groove 1401 together with the output body 141. The output groove 1401 may be defined by outer surfaces of the output body 141 and the output protrusion 142. The output protrusion 142 may be formed such that the output groove 1401 is provided as a plurality of output grooves 1401. The output groove 1401 may have an open radial outer side when the output clutch 14 is viewed in a direction opposite to the reference direction "D." An input protrusion 152 of the input clutch 15, which will be described below, is inserted into the output groove 1401.

An output center groove 1402 recessed in the direction opposite to the reference direction "D" may be formed at a center of the output clutch 14. An input center protrusion of the input clutch 15 is inserted into the output center groove 1402 to guide rotation so that the input clutch 15 and the output clutch 14 are prevented from being separated from each other when the input clutch 15 and the output clutch 14 rotate relative to each other.

The charger latch assisting device 1 may include a connection leg 19. One end of the connection leg 19 is coupled to the output clutch 14, and the other end thereof is coupled to the elastic member 17. Thus, the elastic member 17 is connected to the output clutch 14 via the connection leg 19. The connection leg 19 includes a clutch leg 191 connected to the output clutch 14 and an elastic leg 192, and the elastic leg 192 and the clutch leg 191 are connected to each other. Since extension directions of the elastic leg 192 and the clutch leg 191 are different from each other, the connection leg 19 may be bent at a point at which the elastic leg 192 and the clutch leg 191 meet each other.

The charger latch assisting device 1 may include the elastic member 17. Both ends of the elastic member 17 may be connected to an assisting plate 121 coupled to the assisting housing 11 and the output clutch 14 to swingably support the output clutch 14 with respect to the assisting housing 11. The elastic member 17 may be made of an elastic material. Thus, when the output clutch 14 moves by the contactor 16, the elastic member 17 may be elastically deformed by at least one of tension, compression, bending, twisting, or combinations thereof, thereby applying a restoring force to the output clutch 14. The elastic member 17 applies the restoring force to the output clutch 14 so that the output clutch 14 may return to a default position thereof.

The other end of the elastic member 17 connected to the assisting plate 121 coupled to the assisting housing 111 may be positioned behind one end thereof connected to the connection leg 19 with respect to a charging direction in which the charging adapter 22 of the charger 2 faces. When the output clutch 14 moves by the contactor 16, the elastic member 17 may be compressed and include a compression spring that applies the restoring force to the output clutch 14 due to the compression.

The charger latch assisting device 1 may include the input clutch 15. The input clutch 15 rotates to press the latch button 242 to move the output clutch 14. The input clutch 15 may rotate according to an embodiment of the present disclosure to press and rotate the output clutch 14. The input clutch 15 may rotate with the reference direction "D" as an axial direction to rotate the output clutch 14 with the reference direction "D" as an axial direction.

The input clutch 15 may include an input body 151 and the input protrusion 152. The input body 151 may be connected to a driver 18 and rotate by a driving force transmitted from the driver 18. The input body 151 may rotate with the reference direction "D" as an axial direction. The input body 151 may include a driving connection hole 150 to be connected to the driver 18. A shaft 182 of the driver 18 may be inserted into the driving connection hole 150.

The charger latch assisting device 1 may include the driver 18. The driver 18 is a device that generates a driving force from electric power when power is applied. The driver 18 may include a driving body 181 including a motor, an actuator, and the like that generate the driving force and the shaft 182 that outputs the rotational driving force generated by the driving body 181. The driver 18 may be fixed to the assisting housing 11.

When the input clutch 15 rotates with the reference direction "D" as an axial direction, the input protrusion 152 may protrude from the input body 151 in the direction opposite to the reference direction "D" and may be inserted into the output groove 1401 to press the output protrusion 142. In a cross section cut along a plane perpendicular to the reference direction "D," an area of the input protrusion 152 may be smaller than that of the output groove 1401. Thus, when the input clutch 15 or the output clutch 14 rotates within a predetermined range, the input protrusion 152 and the output protrusion 142 are not in contact with each other, and thus the input clutch 15 and the output clutch 14 may move relative to each other and rotate independently. However, when the input clutch 15 rotates out of this range, the input protrusion 152 may press the output protrusion 142 to rotate the output clutch 14, and the contactor 16 may move to press the latch button 242.

The input protrusion 152 may be provided as a plurality of input protrusions 152. Thus, the input protrusions 152 may be inserted into the plurality of output grooves 1401, respectively. The input protrusions 152 may press the output grooves 1401 at a plurality of positions, and thus the output clutch 14 may stably rotate by the input clutch 15.

The input protrusion 152 may be disposed outside the input body 151 in a radial direction when viewed in the reference direction "D." An outer surface of the input protrusion 152 with respect to a circumferential direction of the input body 151 may have a shape corresponding to a shape of a side surface of the output protrusion 142 in contact with the input protrusion 152. An inner side of the input protrusion 152 in the radial direction may have a shape protruding convexly inward in the radial direction.

As described above, in addition to the output clutch 14 being rotatably coupled to the assisting housing 11, in a modification of the first embodiment of the present disclosure, the contactor and the output clutch may vertically translate as the latch button moves and the output clutch may be coupled to the assisting housing to enable the linear movement. In this case, one end of the linear elastic member is coupled to the assisting housing, the other end thereof is coupled to the output clutch, and thus the elastic member may support the output clutch swingably along a straight line. In this case, the input clutch may rotate to press the output clutch so as to press the latch button.

The charger latch assisting device 1 may include the detection target 13 and the detector 122. The detection target 13 is coupled to the output clutch 14 to move in conjunction with the output clutch 14. It is illustrated in the drawings that the detection target 13 extends rearward from the output clutch 14 with respect to the charging direction. The connection leg 19 may be coupled to a side of the output clutch 14 in the reference direction "D," and the detection target 13 may be coupled to a side of the output clutch 14 in the direction opposite to the reference direction "D." The detector 122 detects movement of the detection target 13 to identify the movement of the latch button 242. The detector 122 may be coupled to the assisting plate 121 coupled to the assisting housing 111, generate a detection signal from the movement of the detection target 13, and transmit the generated detection signal to a processor.

Figure 7:
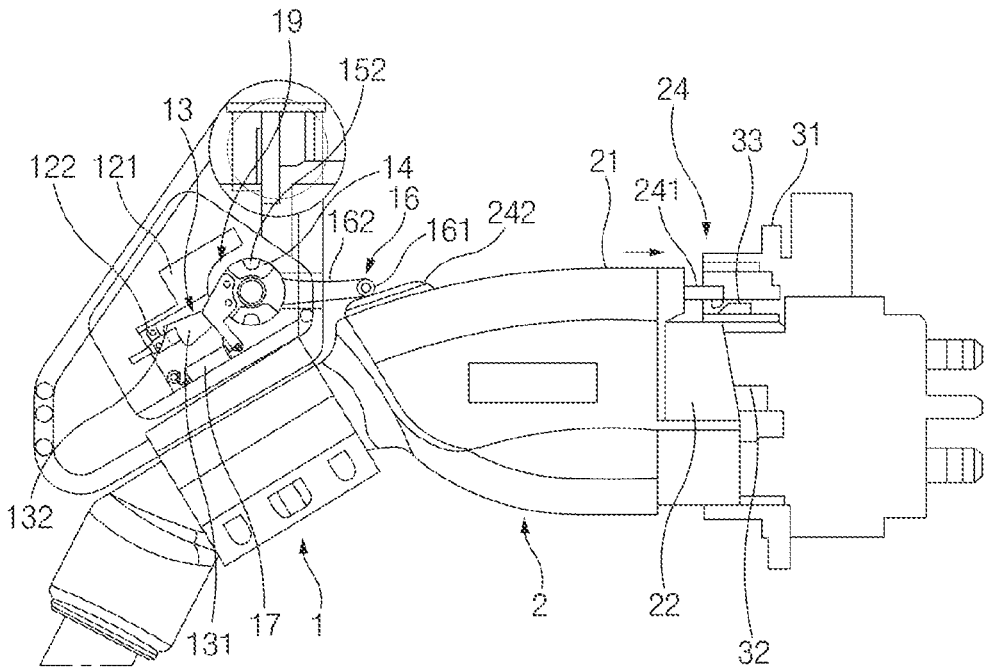
FIGS. 7 to 9 are views sequentially illustrating an operation of the charger latch assisting device according to the first embodiment of the present disclosure when the charger is coupled to the charging port.
Figure 8:
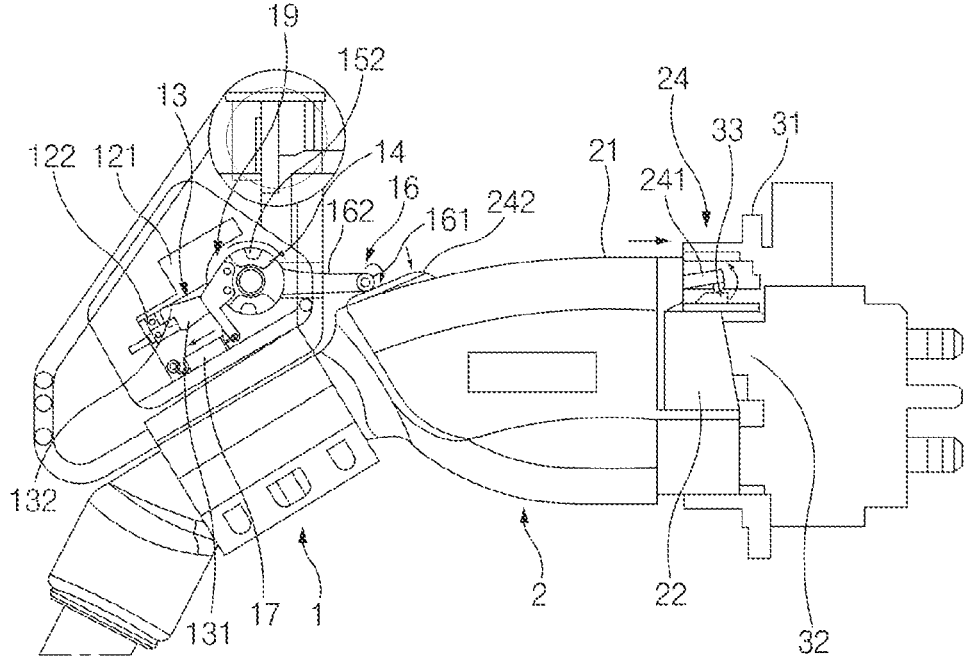

The detection target 13 may include a detection target body 131 extending from the output clutch 14 and a detection target end 132 extending from the detection target body 131. When viewed in an axial direction of the output clutch 14, that is, the reference direction "D," the detection target end 132 may have a thickness smaller than a thickness of the detection target body 131 with respect to a direction in which the output clutch 14 rotates, so that an area overlapping the detector 122 changes as the output clutch 14 rotates. Thus, as illustrated in FIGS. 7 and 8, when the output clutch 14 rotates, an area of the detection target 13 overlapping the detector 122 may increase or decrease. Since signals generated by the detector 122 change due to this difference, the processor may identify the movement of the detection target 13. The detection target body 131 may have a shape tapered as the detection target body 131 approaches the output clutch 14.

A configuration of the detector 122 may be made in various manners. The detector 122 may include a photosensor that may irradiate and detect a light beam to identify whether the detection target 13 is present. The detector 122 may include an encoder that may irradiate and detect a light beam to identify a position of the detection target 13. The detector 122 may include a limit switch that may detect contact with the detector 122 or separation from the detector 122 as the detection target 13 moves. When the detection target 13 has magnetism, the detector 122 may include a Hall sensor that may detect a change in magnetism as the detection target 13 moves. When the detection target 13 is made of metal, the detector 122 may include a proximity sensor through which a current may flow to generate an induced current to identify a distance from the detection target 13. The detector 122 may include a variable resistor operated by the movement of the detection target 13. The detector 122 may include one of the above sensors or include combinations including two or more of the sensors.

The charger latch assisting device 1 may include a controller. The controller may include the processor and a memory. The processor is electrically connected to the detector 122 and the driver 18 and may perform a control to receive a signal generated by acquiring the movement of the detection target 13 by the detector 122 and to operate the driver 18 when a latch release command is provided. The processor serves as a component including an element that may perform a logic operation for performing a control command and may include a central processing unit (CPU) or the like. The processor may be connected to various components, transmit a signal according to the control command to the respective components to perform control, and receive information acquired by the connection to various sensors or acquirers in the form of a signal. Since the processor may be electrically connected to the respective components, the processor may be connected with wires or further include a communication device capable of wireless communication to perform mutual communication.

Control commands performed by the processor may be stored in the memory and utilized. The memory may be a storage device such as a hard disk drive (HDD), a solid state drive (SSD), a server, a volatile medium, and a non-volatile medium, but the types of the memory are not limited thereto. In addition, data and the like that the processor needs to perform a work may be further stored in the memory.

Figure 9:
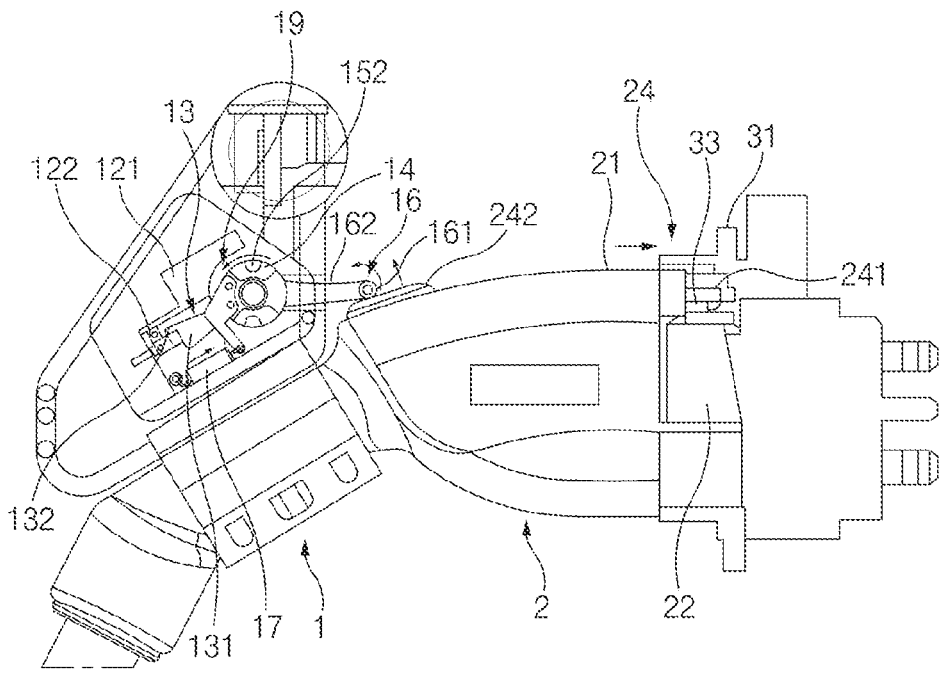

FIGS. 7 to 9 are views sequentially illustrating an operation of the charger latch assisting device 1 according to the first embodiment of the present disclosure when the charger 2 is coupled the charging port 3.

How the charger latch assisting device 1 moves when the charger 2 is coupled to the charging port 3 will be described with reference to FIGS. 7 to 9. Referring to FIG. 7, to couple the charger 2 to the charging port 3, the charger 2 approaches the charging port 3 in the charging direction. In a state before the latch 24 and the port stopper 33 meet each other, all of the latch 24, the output clutch 14, and the like are arranged in respective default positions thereof.

When the charger 2 moves further toward the charging port 3 as compared to FIG. 7, the latch protrusion 241 of the latch 24 rides up the port stopper 33 as illustrated in FIG. 8. Accordingly, the latch 24 rotates so that the latch button 242 lowers. Since the latch button 242 lowers, the contactor 16 in contact with the latch button 242 lowers, and the output clutch 14 connected to the contactor 16 rotates. A direction in which the output clutch 14 rotates may be a clockwise direction when viewed in the direction opposite to the reference direction "D" as illustrated. Since the output clutch 14 rotates, the detection target 13 may rotate to be partially separated from the detector 122. Thus, the detector 122 may identify that the output clutch 14 rotates and deviates from the default position thereof. The processor may receive a signal from the detector 122 and identify that the latch 24 is being coupled to the port stopper 33.

However, the input clutch 15 may be disposed in an original default position despite the rotation of the output clutch 14 by the operation of the latch 24. This is because the output groove 1401 is formed with more margin than the input protrusion 152 even when the output clutch 14 rotates, and thus the output protrusion 142 does not press the input protrusion 152.

As illustrated in FIG. 8, when the output clutch 14 deviates from the default position, the elastic member 17 is elastically deformed to apply the restoring force to the output clutch 14. As illustrated, the elastic member 17 may be compressed.

When the charger 2 moves further toward the charging port 3 as compared to FIG. 8, the latch protrusion 241 is stopped by the port stopper 33 as illustrated in FIG. 9. As the latch protrusion 241 is stopped by the port stopper 33, the latch 24 returns to a default state of FIG. 7, and thus the latch button 242 raises again. Since the latch button 242 raises, the contactor 16 in contact with the latch button 242 raises, and the output clutch 14 connected to the contactor 16 rotates. A direction in which the output clutch 14 rotates may be a counterclockwise direction when viewed in the direction opposite to the reference direction "D" as illustrated. Since the output clutch 14 rotates to return to the default position, the detection target 13 returns to a default position, and thus an area of the detection target 13 overlapping the detector 122 may increase again. Thus, the detector 122 may identify that the output clutch 14 returns to the default position. The processor may receive a signal from the detector 122 and identify that the latch 24 has been coupled to the port stopper 33. As illustrated in FIGS. 7 and 8, the input clutch 15 may be positioned in the default position as it is.

A restoring force of the return member may be applied so that the latch 24 returns to a default position, and the restoring force of the elastic member 17 may be applied so that the output clutch 14 returns to the default position. The elastic member 17 may also return to a default length and thus become an elastically undeformed state.

Figure 10:
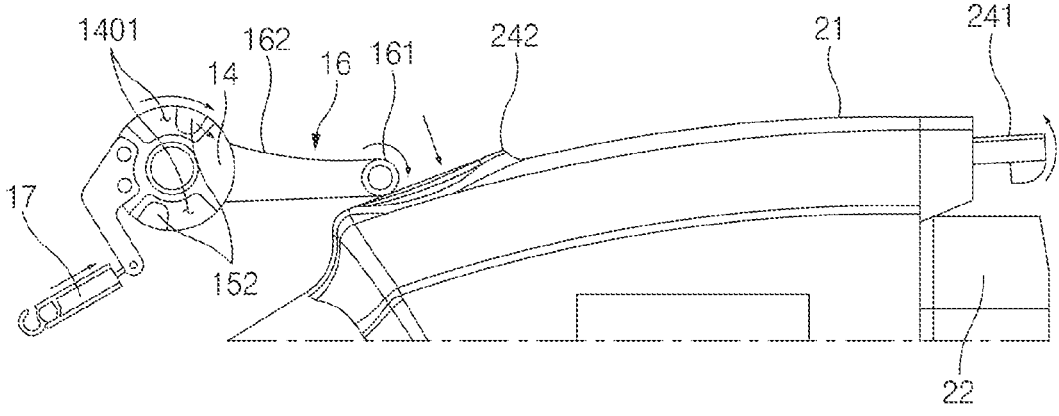
FIG. 10 is a view illustrating a situation in which a latch is unlocked using the charger latch assisting device according to the first embodiment of the present disclosure.

FIG. 10 is a view illustrating a situation in which the latch 24 is unlocked using the charger latch assisting device 1 according to the first embodiment of the present disclosure.

When the processor receives a command of unlocking the latch 24, the processor operates the driver 18 to rotate the input clutch 15. A direction in which the input clutch 15 rotates may be a clockwise direction when viewed in the direction opposite to the reference direction "D" as illustrated. As the input clutch 15 rotates, the input protrusion 152 presses the output protrusion 142 of the output clutch 14 placed on the default position in a clockwise direction, and thus the output clutch 14 may rotate in the same direction as the rotational direction of the input clutch 15. Thus, the contactor 16 connected to the output clutch 14 rotates to press the latch button 242 downward. The latch button 242 is pressed downward, the latch 24 rotates, and the latch protrusion 241 raises and may be in a state in which the latch protrusion 241 may be separated from the port stopper 33. That is, a state in which the charger 2 and the charging port 3 are coupled is released. In this case, when the charger 2 moves in a direction opposite to the charging direction, the charger 2 may be separated from the charging port 3.

Elastic Member According to Second to Fourth Embodiments

Figure 11:
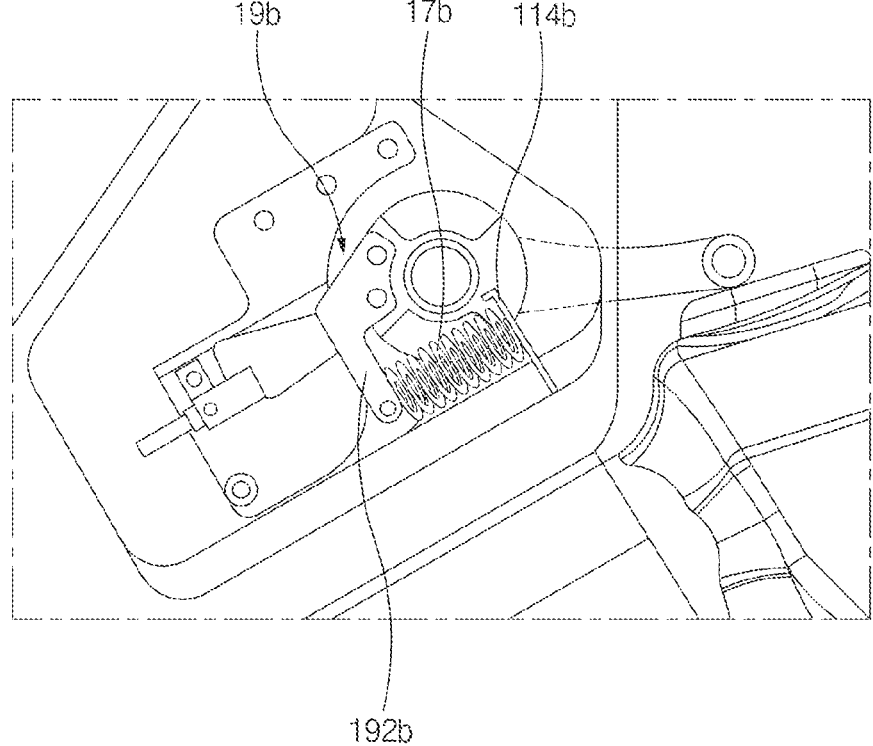
FIG. 11 is a view of a configuration of a charger latch assisting device according to a second embodiment of the present disclosure.
Figure 12:
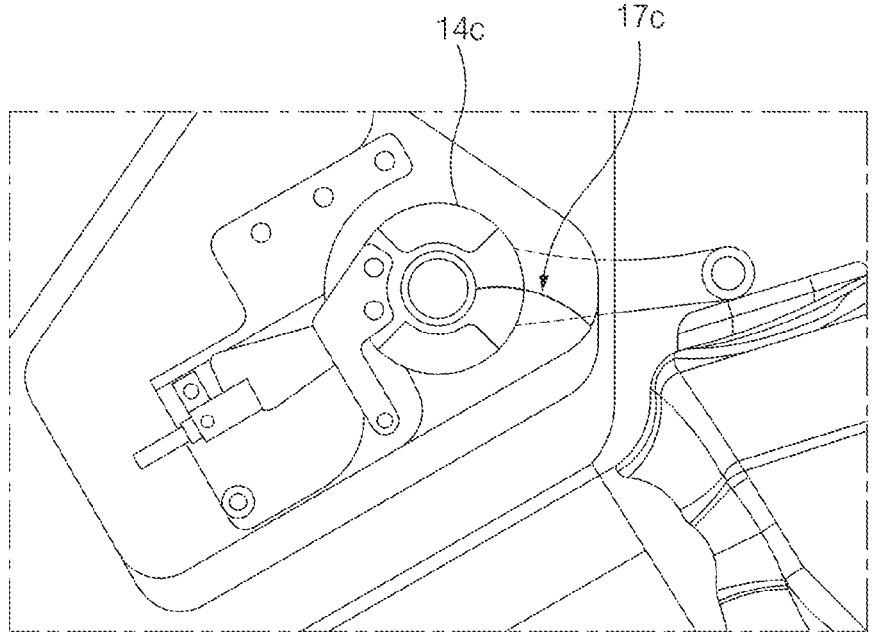
FIG. 12 is a view of a configuration of a charger latch assisting device according to a third embodiment of the present disclosure.
Figure 13:
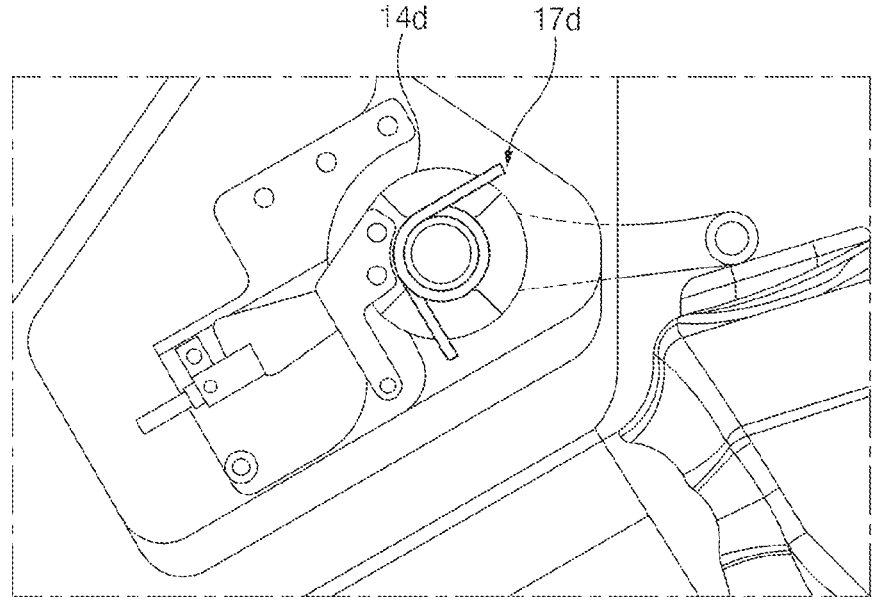
FIG. 13 is a view of a configuration of a charger latch assisting device according to a fourth embodiment of the present disclosure.

FIG. 11 is a view of a configuration of a charger latch assisting device according to a second embodiment of the present disclosure. FIG. 12 is a view of a configuration of a charger latch assisting device according to a third embodiment of the present disclosure. FIG. 13 is a view of a configuration of a charger latch assisting device according to a fourth embodiment of the present disclosure.

The charger latch assisting device according to the second embodiment to the fourth embodiment of the present disclosure is different from the charger latch assisting device 1 according to the first embodiment in terms of elastic members 17b, 17c, and 17d and configurations related thereto. Thus, only a difference therebetween will be further described, and the description according to the first embodiment of the present disclosure will be applied to the other components.

The elastic member 17b according to the second embodiment includes a tension spring. The charger latch assisting device according to the second embodiment may include a support wall 114b coupled to the assisting housing 11. One end of the elastic member 17b is coupled to the support wall 114b, the other end thereof is coupled to an elastic leg 192b of a connection leg 19b, and thus the output clutch 14 may be swingably supported. Thus, when the output clutch 14 rotates and thus deviates from the default position, the elastic member 17b may be compressed and elastically deformed and thus may apply a restoring force to the connection leg 19b.

The elastic member 17c according to the third embodiment includes a leaf spring. One end of the leaf spring is coupled to an output clutch 14c, the other end thereof is coupled to the assisting housing 11, and thus the output clutch 14c may be swingably supported. Thus, when the output clutch 14c rotates and thus deviates from the default position, the elastic member 17c may be bent and elastically deformed and thus may apply a restoring force to the output clutch 14c.

The elastic member 17d according to the fourth embodiment includes a torsion spring. The torsion spring may be elastically deformed according to rotation of an output clutch 14d. Thus, when the output clutch 14d rotates and thus deviates from the default position, the elastic member 17d may be twisted and elastically deformed and thus may apply a restoring force to the output clutch 14d.

The types of springs that may be included in the elastic members 17b, 17c, and 17d through the second embodiment to the fourth embodiment have been described, and the elastic members 17b, 17c, and 17d may include one of the above sensors or include combinations including two or more of the sensors.

Fifth Embodiment

Figure 14:
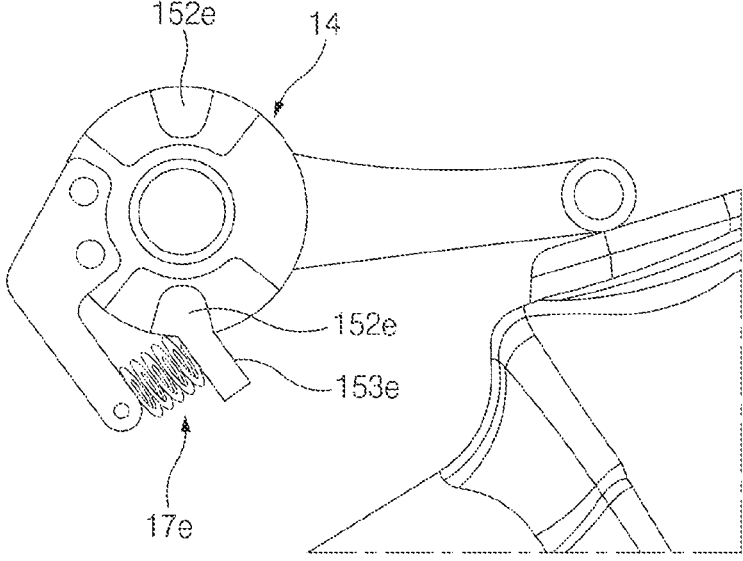
FIG. 14 is a view of a configuration of a charger latch assisting device according to a fifth embodiment of the present disclosure.

FIG. 14 is a view of a configuration of a charger latch assisting device according to a fifth embodiment of the present disclosure.

The charger latch assisting device according to the fifth embodiment of the present disclosure is different from the charger latch assisting device 1 according to the first embodiment in terms of an elastic member 17e and configurations related thereto. Thus, only a difference therebetween will be further described, and the description according to the first embodiment of the present disclosure will be applied to the other components.

Both ends of the elastic member 17e according to the fifth embodiment may be connected to the input clutch 15 and the output clutch 14 to swingably support the output clutch 14 with respect to the input clutch 15. The input clutch 15 may include an input leg 153e protruding radially outward from an input protrusion 152e. One end of the elastic member 17e may be connected to the input leg 153e. Thus, when the charger 2 is coupled, and when the latch button 242 is lowered to rotate the output clutch 14, the input protrusion 152e is fixed to a default position, and thus the elastic member 17e is stretched and elastically deformed to apply the restoring force to the output clutch 14.

Sixth Embodiment

Figure 15:
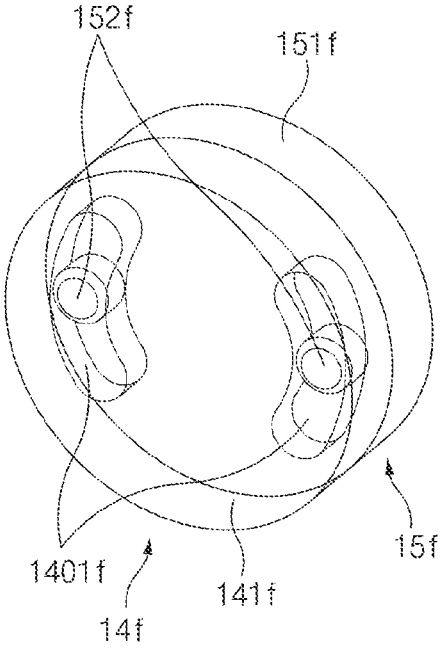
FIG. 15 is a view illustrating a coupling relationship between an output clutch and an input clutch of a charger latch assisting device according to a sixth embodiment of the present disclosure.
Figure 16:
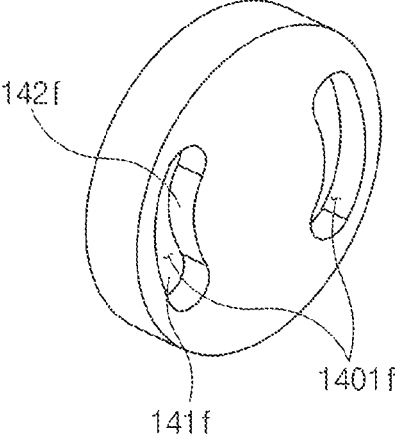
FIG. 16 is a perspective view illustrating the output clutch of the charger latch assisting device according to the sixth embodiment of the present disclosure.
Figure 17:
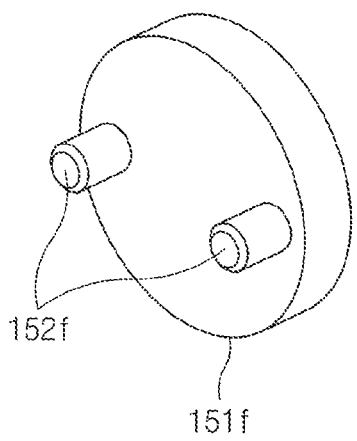
FIG. 17 is a perspective view illustrating the input clutch of the charger latch assisting device according to the sixth embodiment of the present disclosure.

FIG. 15 is a view illustrating a coupling relationship between an output clutch 14f and an input clutch 15f of a charger latch assisting device according to a sixth embodiment of the present disclosure. FIG. 16 is a perspective view illustrating the output clutch 14f of the charger latch assisting device according to the sixth embodiment of the present disclosure. FIG. 17 is a perspective view illustrating the input clutch 15f of the charger latch assisting device according to the sixth embodiment of the present disclosure.

The charger latch assisting device according to the sixth embodiment of the present disclosure is different from the charger latch assisting device 1 according to the first embodiment in terms of the output clutch 14f and the input clutch 15f. Thus, only a difference therebetween will be further described, and the description according to the first embodiment of the present disclosure will be applied to the other components.

An output groove 1401$f$ of the output clutch 14$f$ according to the sixth embodiment may have the form of a slit surrounded by an output protrusion 142$f$ when viewed in the direction opposite to the reference direction "D." An output body 141$f$ may be formed in a disk shape. The output groove 1401$f$ may have a shape extending in a circumferential direction of the output body 141$f$. The output protrusion 142$f$ may form a closed path so that the output groove 1401$f$ has this shape. The output groove 1401$f$ may be provided as a plurality of output grooves 1401$f$.

An input protrusion 152$f$ of the input clutch 15$f$ according to the sixth embodiment may have the form of a pin protruding from an input body 151$f$ in the direction opposite to the reference direction "D". The input body 151$f$ may be formed in a disk shape. The input protrusion 152$f$ is inserted into the output groove 1401$f$. The input protrusion 152$f$ may be provided as a plurality of input protrusions 152$f$ to correspond to the number of output grooves 1401$f$. The input protrusion 152$f$ is inserted into the output groove 1401$f$ in the form of a slit, and thus the input protrusion 152$f$ may be prevented from being separated from the output groove 1401$f$ in a radial direction.

Seventh Embodiment

Figure 18:
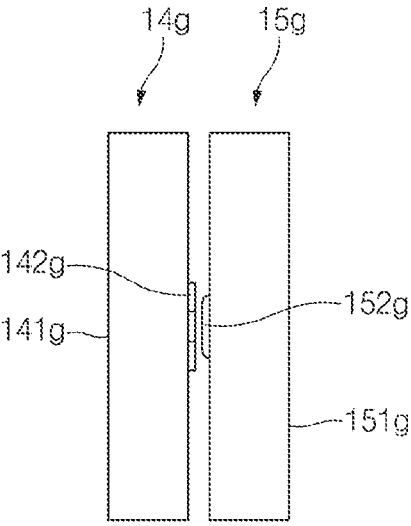
FIG. 18 is a view illustrating an output clutch and an input clutch of a charger latch assisting device according to a seventh embodiment of the present disclosure.
Figure 19:
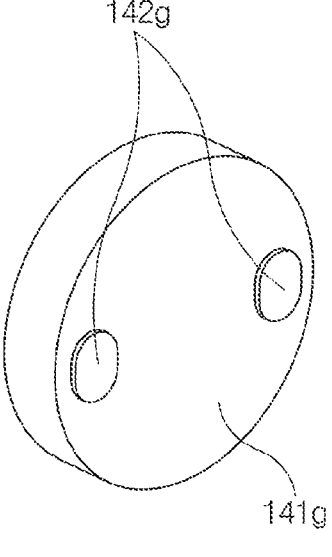
FIG. 19 is a perspective view illustrating the output clutch of the charger latch assisting device according to the seventh embodiment of the present disclosure.
Figure 20:
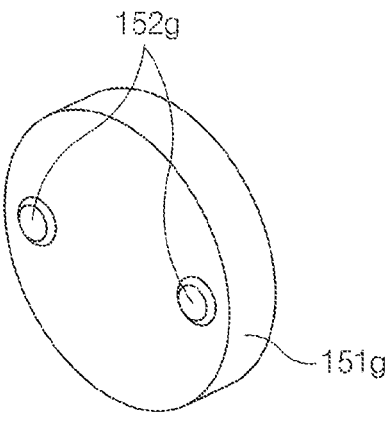
FIG. 20 is a perspective view illustrating the input clutch of the charger latch assisting device according to the seventh embodiment of the present disclosure.

FIG. 18 is a view illustrating an output clutch 14$g$ and an input clutch 15$g$ of a charger latch assisting device according to a seventh embodiment of the present disclosure. FIG. 19 is a perspective view illustrating the output clutch 14$g$ of the charger latch assisting device according to the seventh embodiment of the present disclosure. FIG. 20 is a perspective view illustrating the input clutch 15$g$ of the charger latch assisting device according to the seventh embodiment of the present disclosure.

The charger latch assisting device according to the seventh embodiment of the present disclosure is different from the charger latch assisting device 1 according to the first embodiment in terms of the output clutch 14$g$ and the input clutch 15$g$. Thus, only a difference therebetween will be further described, and the description according to the first embodiment of the present disclosure will be applied to the other components.

The input clutch 15$g$ according to the seventh embodiment includes an input body 151$g$ coupled to the contactor 16 and an input protrusion 152$g$. The input protrusion 152$g$ is an input operator that is coupled to the input body 151$g$ and is an electromagnet. The output clutch 14$g$ includes an output body 141$g$ and an output protrusion 142$g$. The output protrusion 142$g$ is an output operator that is coupled to the output body 141$g$ and has magnetism to interact with the input operator. The input clutch 15$g$ and the output clutch 14$g$ are spaced apart from each other. Thus, when the input clutch 15$g$ rotates by the driver, the input clutch 15$g$ may receive power by the processor, the input operator has a magnetic force, the input operator and the output operator magnetically interact with each other, and thus the output operator may rotate. Further, when the output clutch 14$g$ rotates by operation of the latch button 242, power is not applied to the input operator, and thus the input clutch 15$g$ may not rotate. The output operator may have a shape extending in one direction so that the output operator may normally operate even when the output operator is misaligned with the input operator.

According to the above-described embodiments, whether the latch is stopped by the charging port may be identified, and thus automation of the charging operation may be assisted in relation to the latch of the charger. Further, since the latch may be automatically unlocked, the automation of the charging operation may be assisted in relation to the latch of the charger.

Accordingly, automation of a charging operation may be assisted in relation to a latch of a charger.

Hereinabove, even though it has been described that all components constituting the embodiments of the present disclosure are combined into one part or are operated while combined with each other, the present disclosure is not necessarily limited to these embodiments. That is, all the components may be operated while selectively combined into one or more parts within the scope of the present disclosure. Further, terms such as "includes," "constitutes," or "have" described above mean that the corresponding component may be inherent unless otherwise stated, and thus should be construed as not excluding other components but further including other components. All terms including technical or scientific terms have the same meanings as those commonly understood by those skilled in the art to which the present disclosure pertains unless otherwise defined. The generally used terms defined in dictionaries should be construed as having the meanings that coincide with the meanings of the contexts of the related technologies and should not be construed as ideal or excessively formal meanings unless clearly defined in the present disclosure.

The above description is merely illustrative of the technical spirit of the present disclosure, and those skilled in the art to which the present disclosure belongs may make various modifications and changes without departing from the essential features of embodiments of the present disclosure. Thus, the embodiments disclosed in the present disclosure are not intended to limit the technology spirit of the present disclosure, but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. A charger latch assisting device comprising:
a contactor in contact with a latch button of a charger;
an output clutch coupled to the contactor to rotate in conjunction with the contactor;
a detection target coupled to the output clutch to move in conjunction with the output clutch; and
a detector configured to detect a movement of the detection target to identify a movement of the latch button,
wherein the detection target comprises a detection target body extending from the output clutch and a detection target end extending from the detection target body, and
wherein the detection target end has a thickness that is smaller than a thickness of the detection target body with respect to a direction in which the output clutch is able to rotate to change an area of the detection target end overlapping the detector as the output clutch rotates when viewed in an axial direction of the output clutch.

2. The device of claim 1, wherein the detection target body has a shape that tapers as the detection target body approaches the output clutch.

3. The device of claim 1, wherein the detector comprises a photosensor configured to irradiate and detect a light beam to identify whether the detection target is present.

4. The device of claim 1, wherein the detector comprises an encoder configured to irradiate and detect a light beam to identify a position of the detection target.

5. The device of claim 1, wherein the detector comprises a limit switch configured to detect contact or separation of the detection target.

6. The device of claim 1, wherein the detector comprises a Hall sensor configured to detect a change in magnetism according to the movement of the detection target.

7. The device of claim 1, wherein:

the detection target comprises metal; and the detector comprises a proximity sensor configured to allow a current to flow to identify a distance from the detection target.

8. The device of claim 1, wherein the detector comprises a variable resistor operated by the movement of the detection target.

9. A charger latch assisting device, the device comprising:

a contactor in contact with a latch button of a charger;

an output clutch coupled to the contactor to rotate in conjunction with the contactor;

a detection target coupled to the output clutch to move in conjunction with the output clutch;

a detector configured to detect a movement of the detection target to identify a movement of the latch button;

an assisting housing fixed to the charger; and an elastic member having both ends connected to the assisting housing and the output clutch and swingably supporting the output clutch with respect to the assisting housing.

10. The device of claim 9, wherein, when the output clutch moves by the contactor, the elastic member is elastically deformed by tension, compression, bending, twisting, or combinations thereof to apply a restoring force to the output clutch.

11. The device of claim 10, wherein the elastic member comprises a tension spring, a compression spring, a leaf spring, a torsion spring, or combinations thereof.

12. The device of claim 9, wherein:

the detection target comprises a detection target body extending from the output clutch and a detection target end extending from the detection target body; and the detection target end has a thickness that is smaller than a thickness of the detection target body with respect to a direction in which the output clutch rotates to change an area of the detection target end overlapping the detector as the output clutch rotates when viewed in an axial direction of the output clutch.

13. The device of claim 12, wherein the detection target body has a shape that tapers as the detection target body approaches the output clutch.

14. The device of claim 9, wherein the detector comprises a photosensor configured to irradiate and detect a light beam to identify whether the detection target is present.

15. The device of claim 9, wherein the detector comprises an encoder configured to irradiate and detect a light beam to identify a position of the detection target.

16. The device of claim 9, wherein the detector comprises a limit switch configured to detect contact or separation of the detection target.

17. The device of claim 9, wherein the detector comprises a Hall sensor configured to detect a change in magnetism according to the movement of the detection target.

18. The device of claim 9, wherein:

the detection target comprises metal; and the detector comprises a proximity sensor configured to allow a current to flow to identify a distance from the detection target.

19. The device of claim 9, wherein the detector comprises a variable resistor operated by the movement of the detection target.

20. A charger latch assisting device comprising:

a contactor in contact with a latch button of a charger;

an output clutch coupled to the contactor to rotate in conjunction with the contactor;

a detection target coupled to the output clutch to move in conjunction with the output clutch; and a detector configured to detect a movement of the detection target to identify a movement of the latch button, wherein the detection target comprises a detection target body extending from the output clutch and a detection target end extending from the detection target body, and wherein the detection target end has a circumferential thickness that is smaller than a circumferential thickness of the detection target body, such that an area of overlap between the detection target end and the detector changes as the output clutch rotates.

* * * * *